United States Patent
Law et al.

(10) Patent No.: US 8,195,601 B2
(45) Date of Patent: Jun. 5, 2012

(54) VISITOR-ASSISTED USER PROFILE CREATION

(75) Inventors: David W. Law, Seattle, WA (US); Jeffrey Craig Kunins, Seattle, WA (US); Eric Zappa, Seattle, WA (US); Brian M. Perrin, Redmond, WA (US); Archana M. Gadkari, Bellevue, WA (US); Dan Wu, Lynnwood, WA (US); Joseph Andrew Bono, Kirkland, WA (US); Jeffrey Earl Steinbok, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 12/238,451

(22) Filed: Sep. 26, 2008

(65) Prior Publication Data
US 2010/0082683 A1    Apr. 1, 2010

(51) Int. Cl.
*G06F 17/30* (2006.01)
(52) U.S. Cl. ...................................... 707/600
(58) Field of Classification Search .......... 707/2, 104.1, 707/600; 709/231
See application file for complete search history.

(56) References Cited

U.S. PATENT DOCUMENTS

| | | | |
|---|---|---|---|
| 6,408,309 B1 | 6/2002 | Agarwal | |
| 6,839,680 B1 | 1/2005 | Liu et al. | |
| 7,117,254 B2 | 10/2006 | Lunt et al. | |
| 2002/0083059 A1 | 6/2002 | Hoffman et al. | |
| 2005/0120127 A1 | 6/2005 | Bradley et al. | |
| 2006/0224675 A1* | 10/2006 | Fox et al. | 709/206 |
| 2007/0174477 A1* | 7/2007 | Bostick et al. | 709/231 |
| 2007/0192299 A1* | 8/2007 | Zuckerberg et al. | 707/3 |
| 2007/0218900 A1 | 9/2007 | Abhyanker | |
| 2007/0220090 A1 | 9/2007 | Hall | |
| 2007/0250622 A1 | 10/2007 | Granito | |

OTHER PUBLICATIONS

International Search Report dated Mar. 2, 2010 in International Application No. PCT/US2009/055579.
Pete Cashmore, "MySpace Notifier Sends Profile Updates", Jan. 31, 2007, 6 pages. http://mashable.com/2007/01/31/myspace-notifier/.
"Social Networking", Retrieved on Jul. 8, 2008, 2 pages. http://www.invisionpower.com/community/board/features/social_networking.html.
Abbas, "Orkut add Comments option to Photo Album", May 2, 2008, 6 pages. http://tnerd.com/2008/05/02/orkut-add-comments-option-to-photo-album/.
"DC NetWork Social Network Platform Software Features", DC NetWork Software Features, DC NetCast Media Group Inc., 2007, 12 pages.
"phpFoX", Retrieved on Jul. 8, 2008, 11 pages. http://www.phpfox.com/konsort/whats-new/1.6/.

* cited by examiner

*Primary Examiner* — Etienne Leroux
(74) *Attorney, Agent, or Firm* — Hope Baldauff Hartman, LLC

(57) ABSTRACT

A visitor to a profile page is invited to modify a user profile associated with the profile page. If the visitor elects to provide a suggested modification to the profile page, a message is transmitted to the user that owns the profile page requesting authorization to perform the suggested modification. In response to the message, the user can accept the suggested modification to the user profile, decline the suggested modification to the user profile, or edit the suggested modification to the user profile. If the user accepts or edits the suggested modification to the user profile, the user profile is modified accordingly. In this manner, a visitor to a profile page can assist in the creation of a user profile.

20 Claims, 6 Drawing Sheets

VISITOR-ASSISTED USER PROFILE CREATION

BACKGROUND

Social networking services are focused on building networks of people that share the same background, interests, and/or activities. Many types of social networking services are World Wide Web ("Web")-based and provide a variety of mechanisms for users to discover and add other users to their social network. These types of Web-based social networking services also provide a variety of mechanisms for users to communicate with one another.

In order to facilitate the creation of a social network, many Web-based social networking services ask users to submit information about themselves that is shown to visitors. For instance, a user may be asked to submit their contact information, their date and place of birth, a list of interests, and the names of the schools they have attended. This information is commonly referred to as a "profile," and is typically shown to other users on a profile page accessible through the social networking service.

One type of social networking service user gladly takes the time necessary to provide most, or even all, of the information that may be stored in a profile. In contrast, another type of user will supply only the absolute minimum amount of information necessary to create a valid profile. This second type of user is generally happy to visit and interact with the profile pages of other users without taking the time necessary to create a rich and expressive profile page of their own. However, an incomplete user profile can limit the ability of a social networking service user to locate and interact with other users of the social networking service.

It is with respect to these considerations and others that the disclosure made herein is presented.

SUMMARY

Technologies are described herein for visitor-assisted user profile creation. In particular, through the concepts and technologies presented herein, one user can suggest modifications to a user profile of another user. In this way, third parties can assist a user with the creation of their user profile, thereby removing the burden from the user and increasing the likelihood that the user will have a complete user profile.

According to one aspect presented herein, a user profile is maintained that includes data about a user. A profile page is also maintained through which information contained in the user profile can be viewed. In one embodiment, the profile page also includes an invitation to visitors to the profile page to suggest a modification to the data stored in the user profile about the corresponding user. For instance, the profile page may include an invitation that invites a visitor to the profile page to submit the birth date of the user or another type of information.

If the visitor to the profile page accepts the invitation and submits a suggested modification to the user profile, a message is transmitted to the user that owns the user profile. In one embodiment, the message is a private message that asks the user if they would like to authorize the modification of their user profile in the suggested manner. The message may also permit the user to decline the suggested modification to the user profile or to edit the suggested modification. If the user accepts the suggested modification to the user profile or edits the suggested modification to the user profile, the user profile is updated accordingly.

In one embodiment, a social networking Web application maintains the user profile and provides the functionality described herein for allowing a visitor to a profile page to suggest a modification to the user profile. It should be appreciated, however, that although the embodiments presented herein are described in the context of a social networking Web application, the concepts and technologies presented herein may also be utilized with any type of information site that allows a user to maintain a user profile.

It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
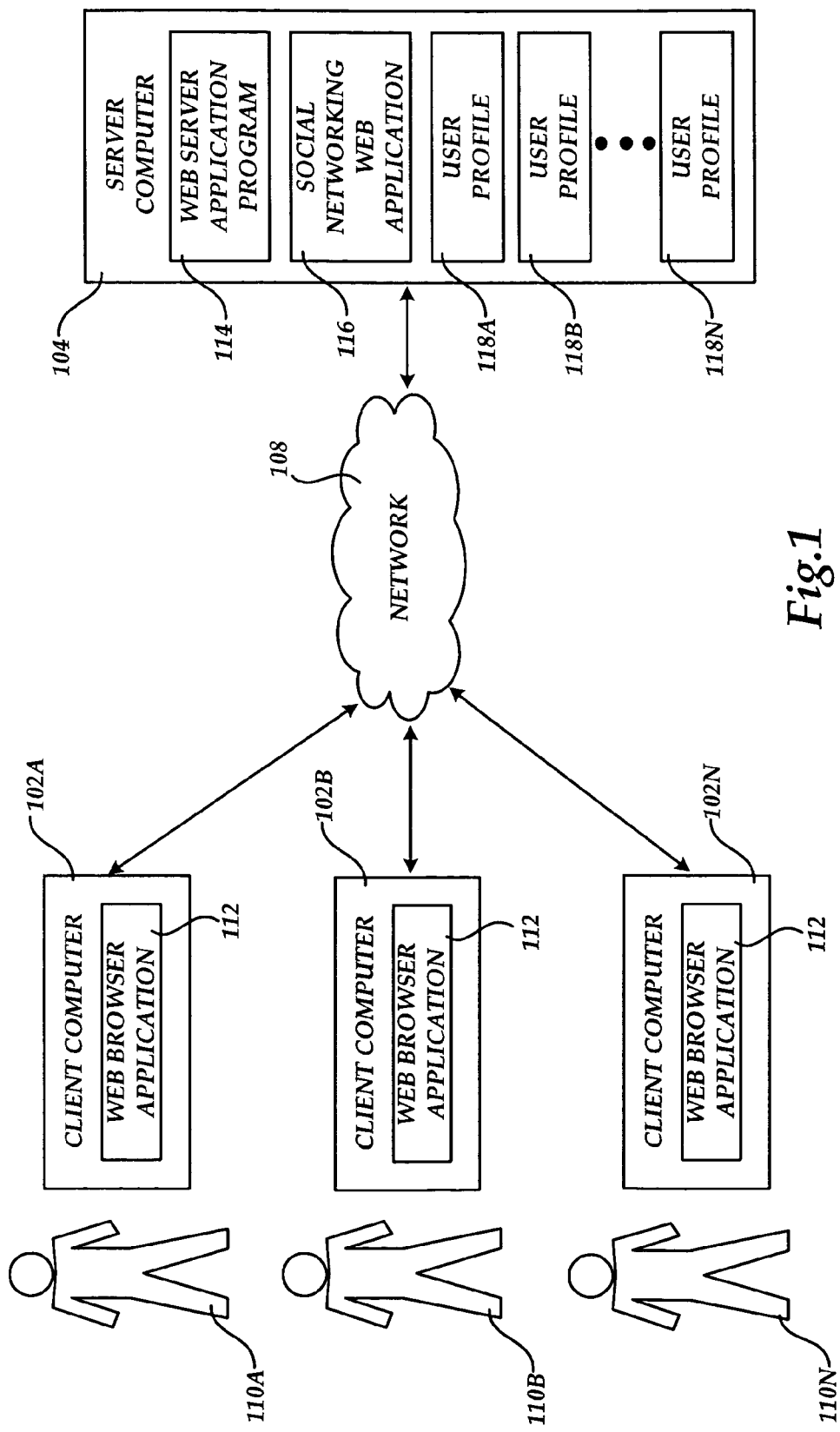
FIG. 1 is a network diagram showing aspects of an illustrative operating environment and several software components provided by the embodiments presented herein.

The following detailed description is directed to technologies for visitor-assisted profile creation. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for visitor-assisted user profile creation will be described.

Turning now to FIG. 1, details will be provided regarding an illustrative operating environment and several software components provided by the embodiments presented herein. In particular, FIG. 1 shows aspects of a system for visitor-assisted user profile creation. As shown in FIG. 1, one system provided herein includes a number of client computers 102A-102N that are connected to a server computer 104 through a network 108. Each of the client computers 102A-102N is a standard desktop, laptop, or mobile computing system capable of executing a Web browser application 112. As known in those skilled in the art, the Web browser application 112 is an application program configured to transmit requests for Web pages and other associated content to other computers accessible via a local or wide area network. The Web browser application 112 is also configured to receive a response to these requests and to render the received Web pages and related files for viewing by a user.

The server computer 104 illustrated in FIG. 1 comprises a standard server computer configured to execute a Web server application program 114. As also known in the art, the Web server application program 114 is a software program configured to receive and respond to requests from the Web browser application 112 for Web pages and other types of data files. In particular, in one implementation the Web server application program 114 is configured to receive and respond to requests from the Web browser application 112 for the social networking Web application 116. Additional details regarding the operation of the social networking Web application 116 will be provided below with respect to FIGS. 2-6.

It should be appreciated that while three client computers 102A-102N and a single server computer 104 have been illustrated in FIG. 1, any number of these computing systems may be utilized. Moreover, it should be appreciated that although a single network 108 has been illustrated in FIG. 1, many more network connections may be utilized to enable data communication between the client computers 102A-102N and the server computer 104. In this regard, it should be appreciated that the network architecture illustrated in FIG. 1 is merely illustrative and more or fewer software and hardware components than illustrated in FIG. 1 may be utilized to implement the embodiments presented herein.

According to embodiments, the users 110A-110N may utilize a respective client computer 102A-102N to execute the Web browser application 112 and to establish a connection with the social networking Web application 116. The social networking Web application 116 is a software application configured to provide a social networking service. As described briefly above, a social networking service is a computing service focused on building networks of people that share the same background, interests, and or activities. The social networking Web application 116 may be configured to provide a variety of mechanisms for users to discover and add other users to a social network. Mechanisms may also be provided for users to communicate with one another.

It should be appreciated that the social networking Web application 116 illustrated in FIG. 1 and described herein may include many more functions than those described herein. It should also be appreciated that although the embodiments presented herein for visitor-assisted user profile creation are described in the context of a social networking Web application 116, the embodiments for visitor-assisted user profile creation described herein may be utilized with any type of computing system that allows a user to create and maintain a user profile.

According to implementations, the social networking Web application 116 allows the users 110A-110N to maintain a user profile 118A-118N, respectively. As discussed briefly above, the user profiles 118A-118N include information about the users 110A-110N, respectively. For instance, according to embodiments, the social networking Web application 116 provides a user interface through which the users 110A-110N can provide information about themselves that is shown to other users on a profile page provided by the social networking Web application 116. This information may include a user's contact information, their date and place of birth, a list of interests, the names of the schools they have attended, and virtually any other type of information regarding the user's 110A-110N.

It should be appreciated that the embodiments herein are not limited by the type of data stored in the user profile 118A-118N. Moreover, it should be appreciated that the profile page provided by the social networking Web application 116 may comprise any type of information page through which one of the users 110A-110N can view information stored within a user profile 118A-118N for another user. The term "visitor" will be utilized herein to refer to the user that is visiting the profile page of another user. For instance, if the user 110B visits a profile page that includes data stored in the user profile 118A for the user 110A, the user 110B will be referred to as a "visitor".

As discussed briefly above, one type of user of the social networking Web application 116 will complete most or all of the information that may be stored in a user profile 118. In contrast, another type of user will supply only the absolute minimum amount of information necessary to create a valid user profile 118. An incomplete user profile, however can limit the ability of the social networking Web application 116 to provide meaningful facilities for allowing the users 110A-110N to discover and interact with one another. Accordingly, the concepts and technologies presented herein allow a visitor, such as the user 110B, to another user's profile page to assist with the creation of the user's user profile 118. Additional details regarding the concepts and technologies presented herein for visitor-assisted user profile creation will be provided below with respect to FIGS. 2-6.

Figure 2:
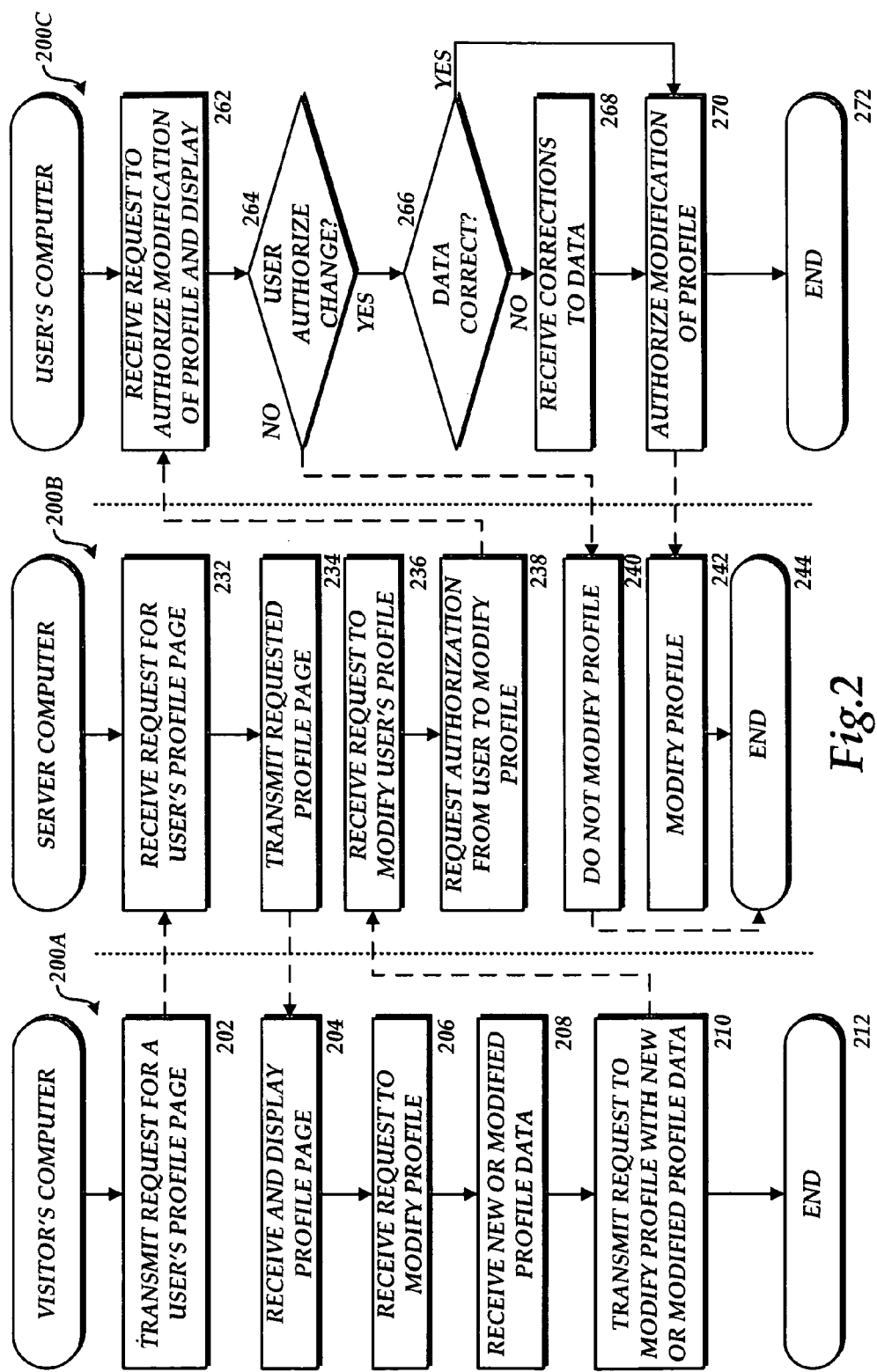
FIG. 2 is a flow diagram showing aspects of a process provided herein in one embodiment for visitor-assisted user profile creation.

Referring now to FIG. 2, additional details will be provided regarding the embodiments presented herein for visitor-assisted user profile creation. In particular, FIG. 2 is a flow diagram illustrating aspects of the operation of the Web browser application 112 and the social networking Web application 116 in one embodiment wherein a visitor to a profile page provided by the social networking Web application 116 may suggest modifications to the user profile 118 of another user.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

FIG. 2 shows three illustrative routines. In particular, a routine 200A is illustrated showing the operation of a client computer 102 that is operated by a visitor to another user's user profile 118. The routine 200B illustrates the operation of the server computer 104. The routine 200C illustrates the operation of the client computer 102 of the user that is associated with the user profile 118 that is being modified. For instance, in one example utilized herein, the user 110B illustrated in FIG. 1 may operate the client computer 102B to interact with the social networking Web application 116. If the user 110B utilizes the computer 102B to interact with a profile page for another user, the user 110B would be considered the visitor and the operation of the client computer 102B would be illustrated by the routine 200A shown in FIG. 2. If the user 110A is operating the client computer 102A and is also the owner of the user profile 118A that the user 110B seeks to modify, the operation of the client computer 102A would be illustrated by the routine 200C.

The routine 200A begins at operation 202, where the user 110B in one example utilizes the client computer 102B and the Web browser application 112 executing thereupon to transmit a request for another user's profile page to the server computer 104. The Web server application program 114 and the social networking Web application 116 receive the request for the profile page at operation 232 of the routine 200B. In response thereto, the Web server application 114 transmits the requested profile page and any associated data files to the client computer 102B at operation 234 of the routine 200B. The Web browser application 112 executing on the client computer 102B receives the profile page and renders the page for display at operation 204 of the routine 200A.

Figure 3:
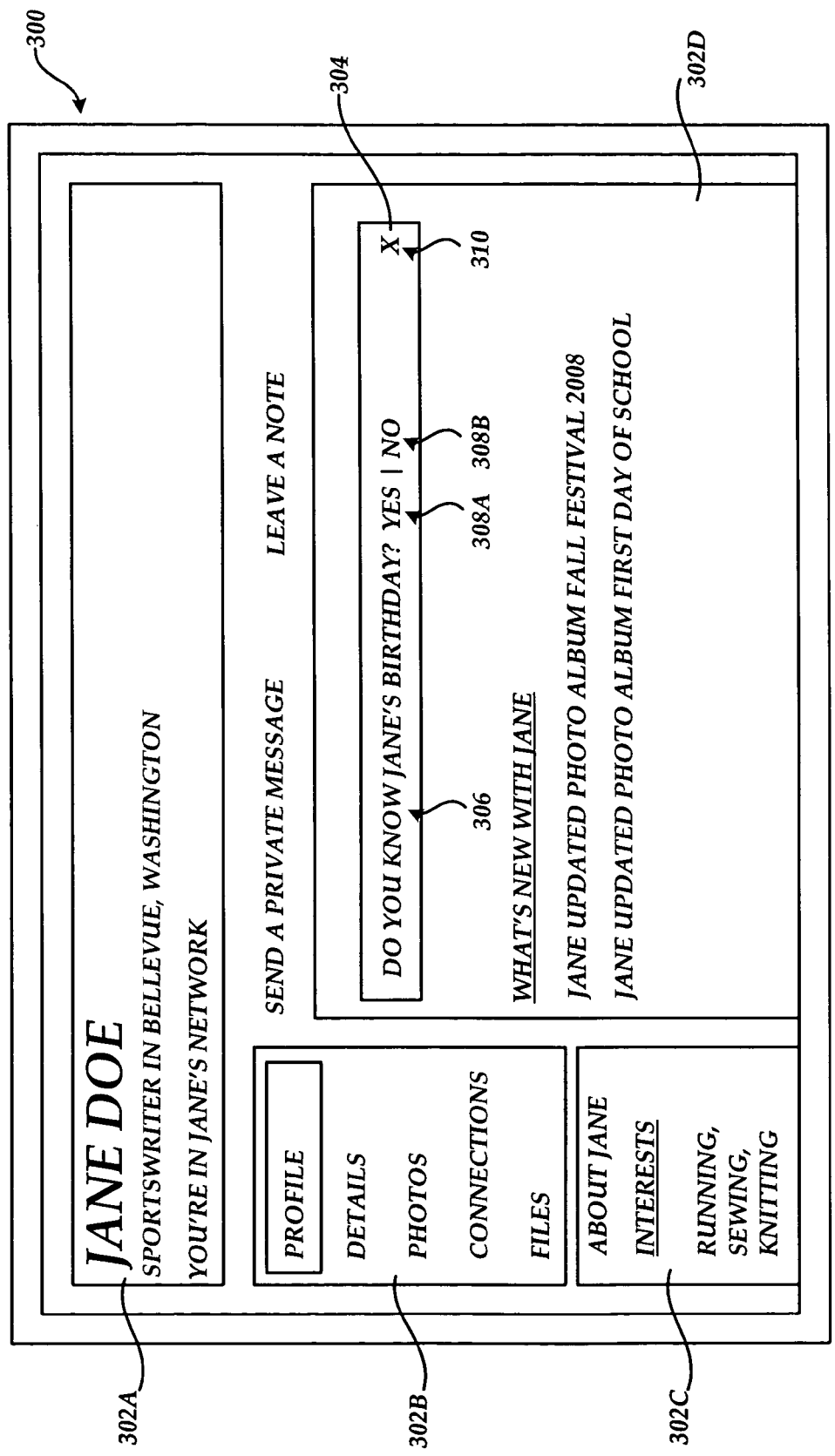
FIGS. 3-4 are screen diagrams showing one illustrative user interface provided herein for allowing a visitor to a profile page to modify the user profile of another user.

FIG. 3 shows a graphical view of a profile page 300 as it might be rendered by the Web browser application 112 in one embodiment. In one implementation, the profile page 300 includes a first user interface pane 302A that identifies the user that owns the profile page 300. It should be appreciated that information stored in the user profile 118 for the user is utilized to create the profile page 300 by the social networking Web application 116. In the example shown in FIG. 3, the pane 302A identifies the owner of the profile page 300 as "Jane Doe", who is a sports writer in Bellevue, Wash. The pane 302A also includes an indication that the visitor to the profile is a member of the profile page owner's social network.

In the embodiment shown in FIG. 3, the profile page 300 also includes a user interface pane 302B that a visitor may utilize to view the aspects of the user profile 118A, details regarding the user associated with the profile page, photographs, connections, data files, and other information. In this embodiment, the pane 302B includes selectable items that may be selected by the visitor to the page to display the desired information. The pane 302C includes data about the owner of the profile page 300, such as their particular interests.

In the implementation shown in FIG. 3, the profile page 300 also includes a user interface pane 300D that includes a section for displaying information regarding recent happenings with respect to the owner of the profile page 300. In this embodiment, the user interface pane 302D also includes an invitation 304 to a visitor to the profile page 300 to modify the data stored in the user profile 118A that is utilized to create the profile page 300. For example, in the illustrative profile page 300 shown in FIG. 3, the invitation 304 comprises an invitation to modify the birth date of the owner of the profile page 300. In this example, text 306 is utilized to make the invitation and selectable user interface items 308A-308B are provided that allow the visitor to indicate whether or not they would like to modify the specified information. A user interface control 310 is also provided that may be utilized to dismiss the invitation 304. It should be appreciated that the user interface shown in FIG. 3 is merely illustrative and that many other types of user interfaces may also be provided to display the contents of a user profile 118A and to provide an invitation to a visitor to the profile page to modify the information contained in the corresponding user profile 118A.

It should be appreciated that, in embodiments, the invitation 304 may be shown selectively based upon the relationship of the visitor to the profile page 300 to the owner of the profile page 300. For instance, in one implementation, the invitation 304 is only shown to those visitors who have an established two-way relationship with the owner. In this implementation, the invitation 304 would not be shown to those visitors that have no relationship with the owner, who have a pending unconfirmed relationship with the owner, or a one-way relationship with the owner. Other factors may be utilized in embodiments to determine which visitors to the profile page 300 are shown the invitation 304. By limiting the display of the invitation 304 to specific classes of individuals, the likelihood that the suggested modifications to the user profile are meaningful may be maximized.

Figure 4:
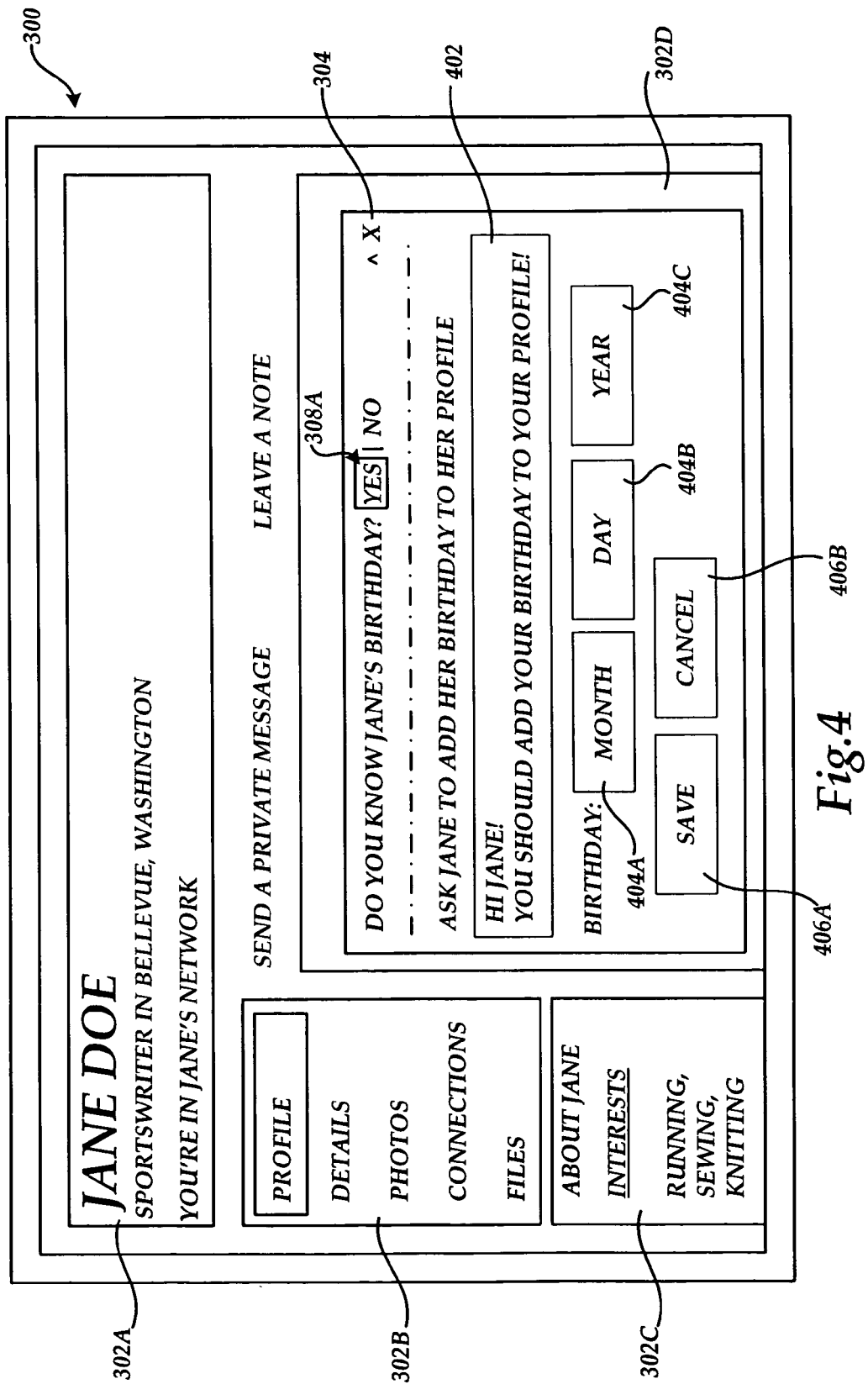

Returning now to FIG. 2, the routine 200A proceeds from operation 204 to operation 206. At operation 206, a request is received to modify a user profile 118A corresponding to the profile page displayed by the Web browser application 112. In this example, such a request may be received through the selection of the user interface control 308A. When such a request is received, the routine 200A proceeds from operation 206 to operation 208 where new or modified profile data is received from the visitor to the profile page to be stored in the user profile 118. FIG. 4 shows one illustrative user interface for receiving this data. For instance, in FIG. 4, the user interface pane 302D has been updated with user interface controls through which a visitor to the profile page 300 can specify the information to be added or modified within the user profile 118A and a message to the owner of the user profile indicating that a modification to the user profile has been suggested. For instance, in the example shown in FIG. 3, a user interface control 402 is provided through which the visitor to the profile page 300 can specify a message to transmitted to the owner of the user profile indicating that a modification has been suggested to the data stored in the user profile 118A. User interface controls 404A-404C have also been provided in the example shown in FIG. 4 through which the visitor to the profile page can specify the birth date of the owner of the user profile 118A. Other user interface controls 406A-406B are also provided for saving and cancelling the suggested modifications to the user profile, respectively. It should be appreciated that the user interface illustrated in FIG. 4 is merely illustrative and that other types of user interfaces may be provided for allowing a visitor to the profile page 300 to suggest a modification to the data stored in the corresponding user profile 118A.

Once a visitor to the profile page 300 has completed the specification of the suggested modification to the corresponding user profile 118A, the routine 200A proceeds from operation 208 to operation 210. At operation 210, the Web browser application 112 transmits a request to modify the user profile 118A corresponding to the profile page 300 with the specified new or modified profile data.

The server computer 104 receives the request to modify the user profile 118 at operation 236 of the routine 200B. In response thereto, the server computer 104 requests authorization from the owner of the corresponding user profile 118A to modify the data stored therein. For instance, in one implementation, the social networking Web application 116 is configured to transmit a private message to the owner of the user profile 118A to which a modification has been suggested. The private message may be displayed to the user when they next login to the social networking Web application 116. It should be appreciated that other types of messages may be utilized to request the authorization to modify the user profile 118A, such as electronic mail messages, short messaging system ("SMS") messages, instant messages, and others.

Figure 5:
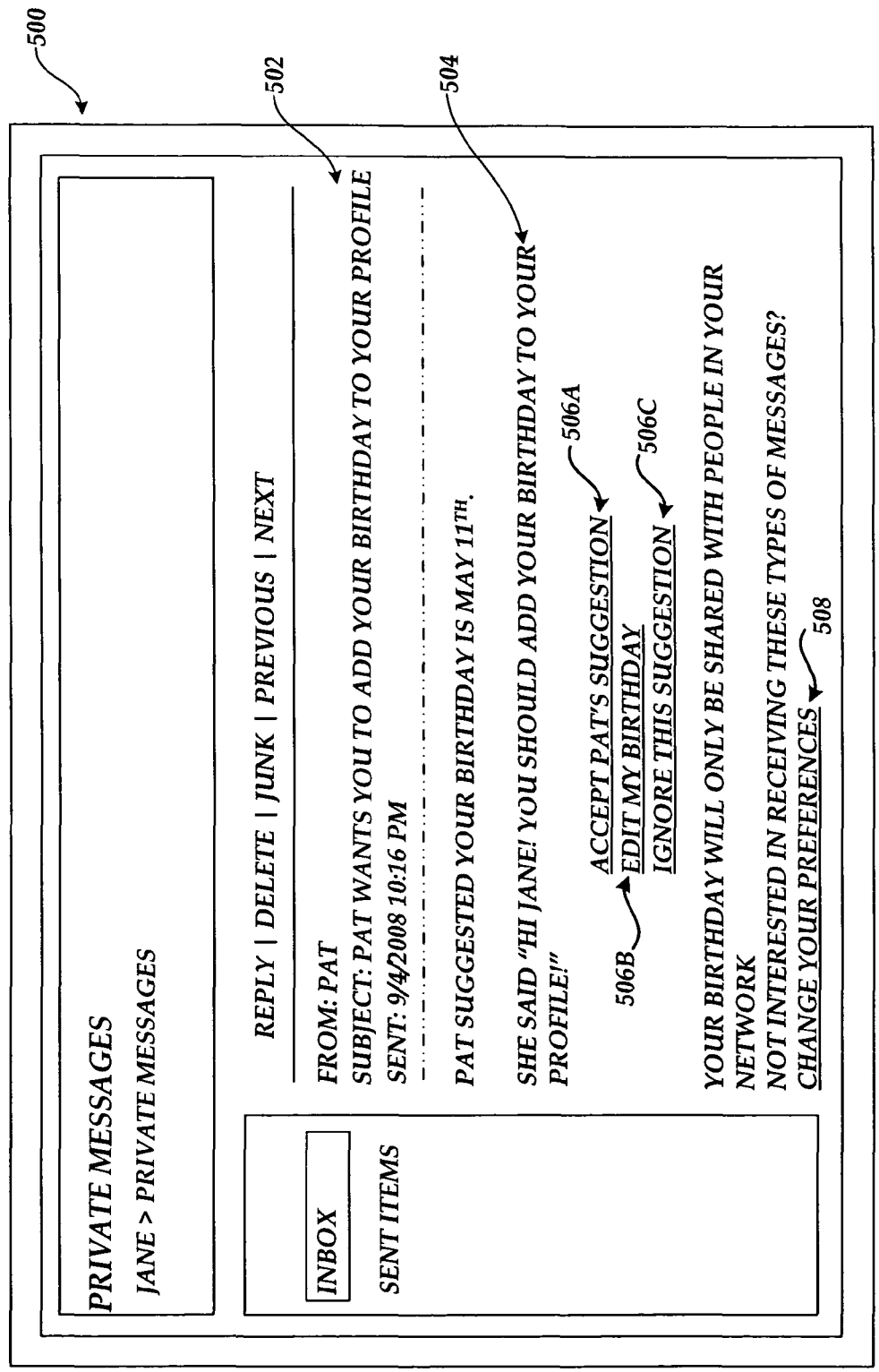
FIG. 5 is a screen diagram showing one illustrative user interface for allowing a user to accept, edit, or ignore modifications to their user profile proposed by a visitor to their profile page in one embodiment presented herein.

The routine 200C begins at operation 262, where the user that owns the user profile 118A for which a modification has been has been suggested utilizes their client computer 102A to receive the request to authorize the modification of their user profile 118A. A user interface for providing such an authorization is illustrated in FIG. 5. In particular, FIG. 5 shows an user interface 500 displayed by a client computer 102A in response to a request by a visitor to a profile page to modify a user profile 118A owned by another user.

The user interface 500 shown in FIG. 5 includes text 502 that identifies the visitor to the profile page, the subject of the request, and the date and time at which the request to modify the user profile 118A was transmitted. The user interface 500 also includes the text 504 specified through the user interface control 402 discussed above with respect to FIG. 4.

In one implementation, selectable items 506A-506C are also provided that may be selected by the owner of the user profile 118A to be modified that will allow the user to reply to the request for authorization by accepting the suggested modification to the user profile 118A, editing the suggested modification to the profile 118A, or declining the suggested modification to the user profile 118A, respectively. In one embodiment, the selectable items 506A-506C are hyperlinks that may be utilized to perform the requested action. In one embodiment, a selectable item 508 is also provided for allowing the user to change preferences regarding the receipt of messages such as those illustrated in FIG. 5. For instance, a user may indicate that they no longer desire to receive messages of this type.

Returning now to FIG. 2, the routine 200C proceeds from operation 262 to operation 264 where the social networking Web application 116 determines whether the user that owns the user profile 118A to be modified has authorized the suggested modification to the user profile 118A. If the suggested modification has not been authorized, the routine 200C branches from operation 264 to operation 240.

At operation 240, the server computer 104 does not perform the suggested modification to the user profile. If, at operation 264, the social networking Web application 116 determines that the user has authorized the suggested modification to their user profile 118A, the routine 200C proceeds from operation 264 to operation 266. At operation 266, a determination is made as to whether the user has indicated that they would like to edit the suggested modification. If so, the routine 200C proceeds to operation 268, where the social networking Web application 116 provides a user interface through which the user that owns the user profile can edit the suggested modification to the user profile 118. If the data is correct, the routine 200 proceeds from operation 266 to operation 270, where the user that owns the user profile 118A to be modified authorizes modification of the profile 118A.

Once the user has authorized modification of their profile 118A, the routine 200B proceeds to operation 242, where the modification to the user profile 118A suggested by the visitor to the profile page is performed. If the owner of the user profile 118A has made edits to the suggested modification, then the edited suggested modification will be utilized to modify the user profile 118A. From operation 210, the routine 200A proceeds to operation 212, where it ends. From operation 242, the routine 200B proceeds to operation 244, where it ends. From operation 270, the routine 200C proceeds to operation 272, where it ends.

Figure 6:
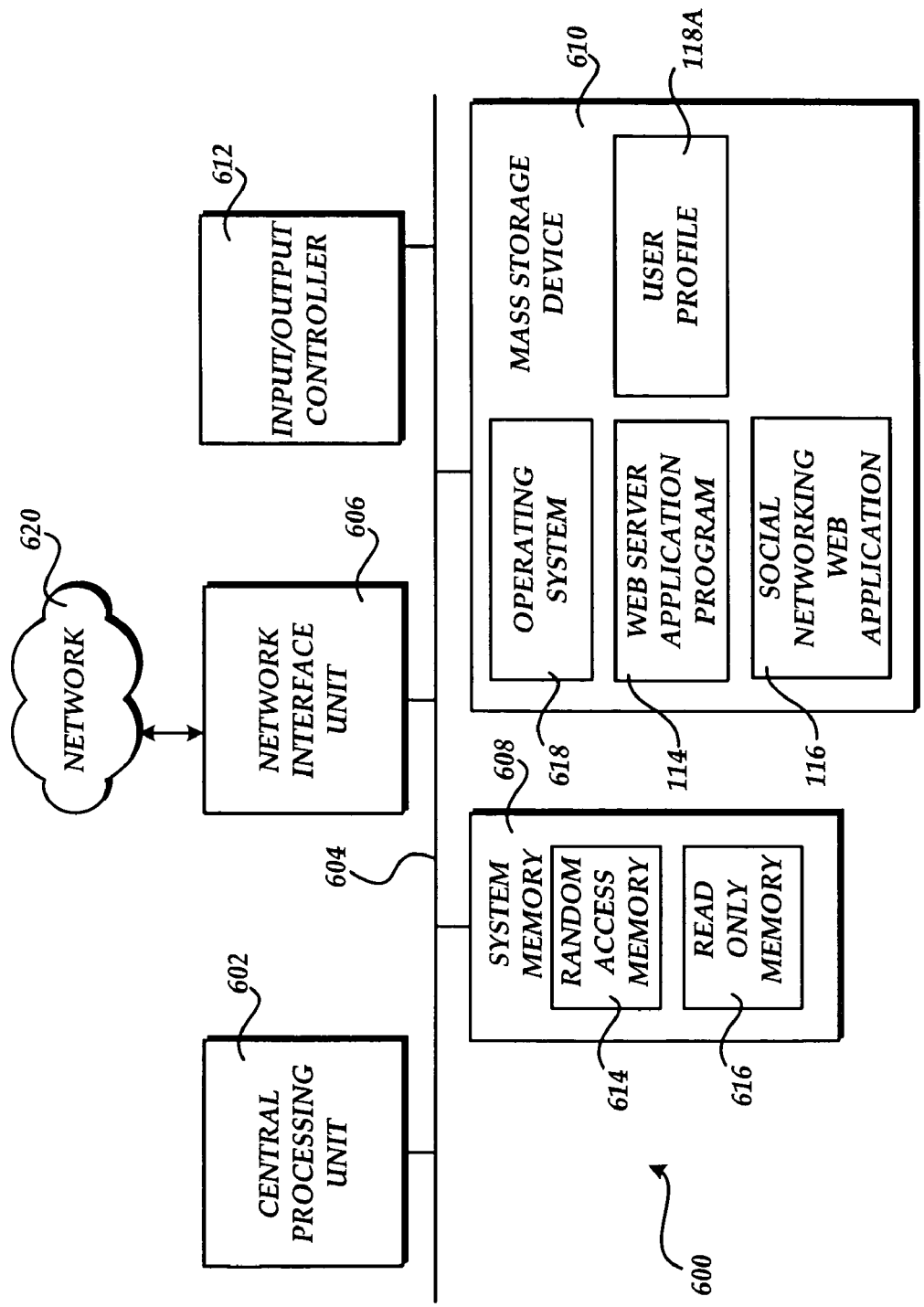
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for visitor-assisted user profile creation in the manner presented above. The computer architecture shown in FIG. 6 illustrates a conventional desktop, laptop, or server computer and may be utilized to execute any aspects of the software components presented herein described as executing on the client computers 102A-102N or the server computer 104.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the Web server application program 114, the social networking Web application 116, and a user profile 118A, each of which was described in detail above with respect to FIGS. 1-5. The mass storage device 610 and the RAM 614 may also store other types of program modules and data.

Based on the foregoing, it should be appreciated that technologies for visitor-assisted user profile creation are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for enabling a visitor to a profile page for a user of a social networking application to modify an incomplete user profile associated with the profile page, the method comprising:

receiving a request for the profile page for the user of the social networking application, the profile page comprising data stored in the incomplete user profile and an invitation for the visitor to provide new data that is not presently included in the data stored in the incomplete user profile in order to assist the user with creation of a complete user profile, thereby at least partially alleviating a burden from the user to self-complete the incomplete user profile;

providing the profile page in response to the request;

receiving a request to modify the incomplete user profile to include the new data in response to the invitation contained in the profile page; and modifying the incomplete user profile to include the new data in response to receiving the request to modify the user profile, thereby assisting the user with creation of the complete user profile.

2. The method of claim 1, wherein the request to modify the incomplete user profile comprises a suggested modification to the incomplete user profile received from the visitor.

3. The method of claim 2, further comprising in response to receiving the request to modify the incomplete user profile, transmitting a message to the user requesting authorization to perform the suggested modification on the incomplete user profile.

4. The method of claim 3, further comprising:

receiving an authorization from the user to perform the suggested modification on the incomplete user profile in response to the message; and modifying the incomplete user profile according to the suggested modification in response to receiving the authorization.

5. The method of claim 3, further comprising:

receiving a reply to the message indicating that the incomplete user profile is not to be modified; and in response to receiving the reply, not performing the suggested modification on the incomplete user profile.

6. The method of claim 3, further comprising:

receiving an authorization from the user, the authorization including an edit to the suggested modification to the incomplete user profile; and modifying the incomplete user profile according to the edit specified by the authorization.

7. The method of claim 3, wherein the social networking application is configured to provide and maintain the incomplete user profile and the profile page, to transmit the message to the user requesting authorization, to receive the authorization to modify the incomplete user profile, and to modify the incomplete user profile in response to receiving the authorization.

8. The method of claim 3, wherein the message comprises a private message transmitted to the user within the social networking application.

9. A computer storage medium having a social networking application comprising computer executable instructions stored thereon which, when executed by a computer, cause the computer to:

store an incomplete user profile for a user of the social networking application and a profile page for the user, the profile page comprising data stored in the incomplete user profile and an invitation for a visitor to the profile page to suggest a modification to the incomplete user profile to provide new data that is not presently included in the data stored in the incomplete user profile in order to assist the user with creation of a complete user profile, thereby at least partially alleviating a burden from the user to self-complete the incomplete user profile;

receive a request for the profile page;

provide the profile page in response to the request;

receive a suggested modification to include the new data in the incomplete user profile from the visitor in response to a selection of the invitation contained in the profile page by the visitor; and to modify the incomplete user profile to include the new data according to the suggested modification, thereby assisting the user with creation of the complete user profile.

10. The computer storage medium of claim 9, having further computer executable instructions stored thereon which, when executed by the computer will cause the computer to transmit a message to the user requesting authorization to perform the suggested modification on the incomplete user profile in response to receiving the suggested modification.

11. The computer storage medium of claim 10, having further computer executable instructions stored thereon which, when executed by the computer will cause the computer to:

receive a reply to the message comprising an authorization to perform the suggested modification; and to perform the suggested modification on the incomplete user profile in response to receiving the reply.

12. The computer storage medium of claim 10, having further computer executable instructions stored thereon which, when executed by the computer will cause the computer to:

receive a reply to the message comprising a rejection of the suggested modification; and to not perform the suggested modification on the incomplete user profile in response to receiving the reply.

13. The computer storage medium of claim 10, having further computer executable instructions stored thereon which, when executed by the computer will cause the computer to:

receive a reply to the message comprising an edit to the suggested modification; and to modify the incomplete user profile according to the edit specified by the reply.

14. The computer storage medium of claim 9, having further computer executable instructions stored thereon which, when executed by the computer will cause the computer to maintain the user profile and the profile page.

15. A method for enabling a first user to modify a user profile associated with a second user, the method comprising:

receiving a request for a profile page associated with the second user who is a member of a social networking Web application, the profile page comprising data stored in the user profile associated with the second user;

providing the profile page to the first user in response to the request;

selectively providing an invitation within the profile page based upon whether a confirmed two-way relationship exists within the social networking Web application between the first user and the second user, the invitation being for the first user to modify the data stored in the user profile in order to assist the second user with creation of the user profile only if the confirmed two-way relationship exists within the social networking Web application between the first user and the second user;

receiving a request from the first user to modify the user profile of the second user in response to the invitation contained in the profile page of the second user;

in response to receiving the request to modify the user profile, transmitting an authorization request to the second user requesting authorization to modify the user profile of the second user;

receiving an authorization from the second user to modify the user profile in response to the authorization request; and modifying the user profile of the second user in response to receiving the authorization, thereby at least partially alleviating a burden from the second user to self-complete the user profile.

16. The method of claim 15, wherein the user profile is maintained by the social networking Web application for the second user.

17. The method of claim 16, further comprising:

receiving a reply to the authorization request indicating that the user profile is not to be modified; and in response to receiving the reply, not modifying the user profile.

18. The method of claim 17, wherein the request to modify the user profile of the second user comprises a suggested modification to the user profile.

19. The method of claim 18, further comprising:

receiving a reply to the authorization request indicating that an edit to the suggested modification is to be utilized to modify the user profile; and in response to receiving the reply, modifying the user profile according to the edit.

20. The method of claim 19, wherein the authorization request comprises a private message transmitted to the second user within the social networking Web application.

* * * * *